United States Patent [19]

Fischer

[11] 4,437,804

[45] Mar. 20, 1984

[54] MOUNTING ELEMENT FOR MOUNTING OBJECT TO SUPPORT STRUCTURE

[76] Inventor: Artur Fischer, Weinhalde 34, D-7244 Waldachtal 3, Tumlingen, Fed. Rep. of Germany

[21] Appl. No.: 266,354

[22] Filed: May 22, 1981

[30] Foreign Application Priority Data

Jun. 14, 1980 [DE] Fed. Rep. of Germany ....... 3022458

[51] Int. Cl.³ .............................................. F16B 13/14
[52] U.S. Cl. ...................................... 411/59; 411/73; 411/412; 411/417
[58] Field of Search ..................... 411/16, 17, 57, 59, 411/73, 412, 413, 417, 424, 308–311, 907, 908, 411, 414, 415, 418, 259, 263, 307

[56] References Cited

U.S. PATENT DOCUMENTS

| 2,242,758 | 5/1941 | Ruggieri | 411/414 |
| 2,380,724 | 7/1945 | Crooks | 411/414 |
| 3,083,609 | 4/1963 | Lovisek | 411/418 |
| 3,199,398 | 8/1965 | Weisz | 411/57 |

FOREIGN PATENT DOCUMENTS

| 12441 | 6/1980 | European Pat. Off. | 411/417 |
| 2240528 | 3/1974 | Fed. Rep. of Germany | 411/413 |
| 2756318 | 6/1979 | Fed. Rep. of Germany | 411/417 |
| 448707 | 12/1912 | France | 411/259 |
| 2028950 | 3/1980 | United Kingdom | 411/59 |

Primary Examiner—Gary L. Smith
Assistant Examiner—Neill Wilson
Attorney, Agent, or Firm—Michael J. Striker

[57] ABSTRACT

A mounting element for mounting an object on a support structure has an elongated expansion sleeve member insertable into a mounting hole of the support structure and having a longitudinal opening, and an elongated expander member insertable into the longitudinal opening so as to expand the expansion sleeve member and having a round thread and a pointed profile thread arranged on the peaks and/or valleys of the round thread and having a pitch corresponding to the pitch of the latter.

15 Claims, 3 Drawing Figures

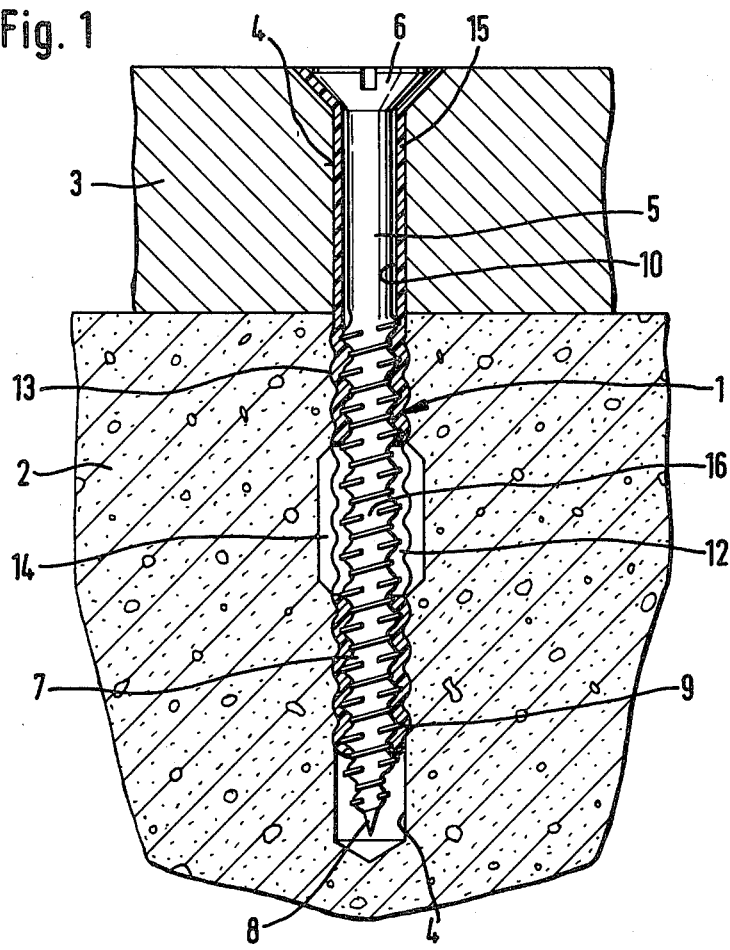
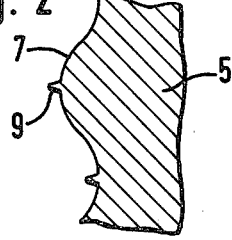
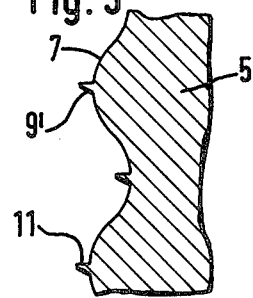

MOUNTING ELEMENT FOR MOUNTING OBJECT TO SUPPORT STRUCTURE

BACKGROUND OF THE INVENTION

The present invention relates to a mounting element for mounting an object to a support structure. More particularly, it relates to a mounting element which includes an expansion sleeve member insertable into a mounting hole of a support structure, and an expander member screwable into the expansion sleeve so as to expand and to fix the same in the support structure and also to support objects to be mounted.

Mounting elements of the above-mentioned general type are known in the art. In a known mounting element, the expansion sleeve member is composed of synthetic plastic material and has a longitudinal opening for screwing in of the expander member, and advantageously a longitudinal slot. The expander member has a round thread with a narrowing thread outlet extending toward a pointed end of the expander member. Anchoring of the expansion sleeve member of synthetic plastic material in the mounting hole of the support structure is generally attained by screwing in of the expander member formed as a wooden screw. The latter is provided with a thread having a pointed profile. When the screw is screwed into the expansion sleeve, the peaks of the thread are driven very deep into the material of the expansion sleeve member and thereby weaken the cross-section of the expansion sleeve member. Furthermore, the flanks of the thread displace only part of the material of the expansion sleeve member towards the outer wall, whereas the major part of the material of the expansion sleeve member is displaced in a longitudinal direction so that the expansion sleeve member is stretched. Thereby, the shape of the thread of the expander member or mounting screw in connection with the expansion sleeve member of synthetic plastic material is not suitable for optimum anchoring value.

In order to eliminate the above-mentioned disadvantages, it has been proposed in the German Gebrauchsmuster 7,825,757 to use a mounting element in which the expander member or mounting screw has a round thread. The round thread provides not only improvement of the flanks of the expander member because of the favorable fiber location in the expander member, but also results in a considerably greater radial driving of the material of the expansion sleeve member into a wall of the mounting hole in a support structure. This leads to a considerably stronger wedging and thereby anchoring of the expansion sleeve member in the mounting hole. The thread domes are pressed into the material of the expansion sleeve member over a great surface and thereby the outer face of the expansion sleeve member is curved in correspondence with the pitch of the round thread. This causes a wave-like distribution of an expansion pressure with increased clamping force in the region of the thread domes. Since the round thread engages in the material of the expansion sleeve member only to a small depth, the resistance to screwing in of the expander member into the expansion sleeve member is reduced as compared with the wooden screws with threads of conventional shapes.

When the mounting element disclosed in the above-mentioned Gebrauchsmuster is utilized for anchoring in soft materials, such as gas concrete, hollow bricks and the like, a smaller expansion pressure takes place because of the smaller strength of the material. This leads to the fact that the round thread engages in the material of the expansion sleeve member with a smaller depth and the holding value between the expander member and the expansion member reduces because of reduced connection therebetween.

SUMMARY OF THE INVENTION

Accordingly, it is an object of the present invention to provide a mounting element which avoids the disadvantages of the prior art.

More particularly, it is an object of the present invention to provide a mounting element which can be anchored not only in hard materials, but also in weak materials with all above-mentioned advantages.

In keeping with these objects and with others which will become apparent hereinafter, one feature of the present invention resides in a mounting element which has an expansion sleeve member with a longitudinal opening, and an expander member screwable into the longitudinal opening of the expansion sleeve member, wherein the expander member is provided not only with a round thread but also with a further thread having a pointed profile, arranged on the peaks and/or valleys of the round thread and provided with a pitch corresponding to the pitch of the round thread.

When the mounting element is designed in accordance with the present invention, the round thread provides for the above-mentioned favorable flow of fibers in the expander member, as well as the wave-like and thereby improved distribution of the expansion pressure with increased clamping force in the region of the thread domes. The further thread with the pointed profile provides, even in condition of a minimum expansion pressure, an additional interengagement of the expander member with the expansion sleeve member in correspondence with the profile height, without a substantial weakening of the expansion sleeve member and increase of resistance to the screwing in of the expander member. Thereby, when the mounting element is designed in accordance with the present invention, it can be anchored not only in hard materials but also in weak materials and provide a very high holding value in the latter.

In accordance with another feature of the present invention, the further thread which is arranged on the round thread has a saw-tooth shaped profile with inclined flanks facing toward the pointed end of the expander member. The other flanks of the further thread extend normal to the axis of the expander member. Because of the fact that the latter mentioned flanks extend normal to the axis of the expander member and face toward the head of the latter, the pulling force acting upon the expansion sleeve member is applied normal to these flanks. Thereby a further improvement of the interengagement between the expander member and expansion sleeve member is attained.

In accordance with a further feature of the present invention, the profile height of the further thread is smaller than one-fourth of the profile height of the round thread. When the height of the round thread and the height of the further thread are selected in accordance with the above mentioned ratio, favorable results are attained both in hard materials and in weak materials.

Finally, in accordance with still a further feature of the present invention, the inner diameter of the round thread of the expander member corresponds to the inner diameter of the longitudinal opening of the expansion sleeve member. This construction guarantees that the entire material of the expansion sleeve member which is displaced by the thread of the expander member is pressed against the wall of the mounting hole in the support structure, inasmuch as a displacement of this material toward the expander member is excluded.

Yet another feature of the present invention is that the further thread has a plurality of interrupted regions. When the interruptions are provided, the material of the expansion sleeve member insignificantly flows after the termination of the anchoring, into the interruptions so as to form locking means against unscrewing of the expander member in condition of vibrations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a mounting element in accordance with the present invention, arranged in a mounting hole of a support structure and supporting an object;

FIG. 2 is an enlarged view showing a fragment of a thread of an expander member of the mounting element in accordance with the invention; and FIG. 3 is a view substantially corresponding to the view of FIG. 2 but showing a further embodiment of the present invention.

DESCRIPTION OF PREFERRED EMBODIMENTS

The mounting element in accordance with the present invention is utilized for mounting an object identified by reference numeral 3 on a wall or support structure 4.

The mounting element has an expansion sleeve 1 insertable into the mounting hole 4 of the wall 2. The mounting hole 4 has a uniform diameter which is equal to the diameter of the expansion sleeve member 1. The mounting element further includes an expander member or mounting screw 5 having a head 6 and provided with a round thread 7. The round thread 7 of the expander member 5 has a narrowing portion extending to a pointed end 8 of the expander member, for reducing the resistance to screwing in of the expander member 5.

The expander member 5 is also provided with a further thread 9 having a pointed profile. The thread 9 is arranged on the peaks and/or valleys of the round thread 7 and has a pitch corresponding to the pitch of the latter. It is advantageous when the pointed thread 9 is formed so that each of its peaks is located at the axis of symmetry of a respective one of the peaks or valleys of the round thread 7.

The mounting element is used in the following manner. First, the expansion sleeve member 1 is inserted into the mounting hole 4 of the wall 2. Then the expander member 5 for mounting the object 3 is screwed into the expansion sleeve member 1. The inner diameter of the round thread 7 of the expander member 5, or responds to the inner diameter of a longitudinal opening 10 of the expansion sleeve member 1. Thereby, when the expander member 5 is screwed into the expansion sleeve member 1, the double thread profile of the expander member 5 engages into the material of the expansion sleeve member 1 and this material is simultaneously compressed and wedged between the flanks of the round thread 7 of the expander member 5 and the wall of the mounting hole 4 in the support structure 2.

The pointed thread 9 of the expander member 5 has a profile height which is smaller than one-fourth of the profile height of the rounded thread 7. When the expander member 5 is screwed into the expansion sleeve member 1, an interengagement between the expander member 5 and the material of the expansion sleeve member 1 is provided by the pointed thread 9. This is true for the conditions when the support structure 2 is a weak masonry, such as gas concrete, hollow bricks and the like, and provides for a relatively small expansion pressure.

The pointed thread 9 of the expander member 5 shown in FIG. 2 has a symmetrical profile. It is, however, also possible to provide a pointed thread with an asymmetrical profile, as shown in FIG. 3. A further thread 9' of the expander member 5 shown in FIG. 3 has a saw-tooth shaped profile which provides for an especially favorable connection between the expansion sleeve member 1 and the expander member 5. The pointed thread 9' of FIG. 3 has inclined flanks facing toward the pointed end 8 of the expander member 5, and straight flanks which extend normal to the axis of the expander member 5 and face away from the pointed end 8 and toward the head 6 of the expander member 5. The straight flanks are identified by reference numeral 11 and extend thereby normal to the pulling force acting upon the expander member 5 carrying the objects 3.

The expansion sleeve member 1 is provided with longitudinal slots which are limited at both ends of the expansion sleeve member. When the expansion sleeve member 1 is arranged in the support structure of a weak material, the holding force is provided not only by convex portions 13 in the regions of the peaks of the round thread 7, but also by the expansion caused by the slots 12. The expansion sleeve member 1 has also webs 14 which extend along the longitudinal edges of the slots 12. These webs 14 serve for preventing rotation of the mounting element in weak materials and for filling of the slots 12 in hard materials. The webs 14 have a triangular profile which reinforces the webs in direction of rotation, on the one hand, and facilitates bending the webs 14 into the slots 12 in hard materials, on the other hand.

When the mounting element is utilized for mounting door frames or window frames, it may be provided an elongated neck 15 extending into the object 3 to be mounted. The further thread 9 has interrupted regions 16 in which the material of the expansion sleeve member 1 can flow so as to form locking means for preventing screwing out of the expander member in condition of vibrations. The interrupting regions 16 may be provided at identical locations in some convolutions of the pointed thread 9. At the same time other convolutions of the pointed thread 9 may be uninterrupted and arranged in alternating order with the interrupted convolutions.

It will be understood that each of the elements described above, or two or more together, may also find application in other types of constructions differing from the types described above.

While the invention has been illustrated and described as embodied in a mounting element it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A mounting element for mountin an object on a support structure having a mounting hole, comprising an elongated expansion sleeve member insertable into a mounting hole of a support structure and having a longitudinal opening; and an elongated expander member insertable into said longitudinal opening so as to expand said expansion sleeve member and to thereby fix the latter in the mounting hole of the support structure, said expander member being provided with a thread which has a round profile and a predetermined pitch, a plurality of peaks and a plurality of valleys, said expander member being also provided with a further thread which has a pitch corresponding to the pitch of said first-mentioned thread and a pointed profile, said further thread of said expander member being arranged both on said plurality of peaks and in said plurality of valleys of said first-mentioned thread of said expander member.

2. A mounting element for mounting an object on a support structure having a mounting hole, comprising an elongated expansion sleeve member insertable into a mounting hole of a support structure and having a longitudinal opening; and an elongated expander member insertable into said longitudinal opening so as to expand said expansion sleeve member and to thereby fix the latter in the mounting hole of the support structure, said expander member being provided with a thread with a round profile which has a predetermined pitch, a plurality of peaks and a plurality of valleys, said expander member being also provided with a further thread which is arranged on at least one of said pluralities of peaks and valleys and has a pitch corresponding to the pitch of said first-mentioned thread and a pointed profile, said first-mentioned thread of said expander member having a predetermined profile height, and said further thread of said expander member having a profile height which is smaller than one-forth of the profile height of said first-mentioned thread.

3. A mounting element for mounting an object on a support structure having a mounting hole, comprising an elongated expansion sleeve member insertable into a mounting hole of a support structure and having a longitudinal opening; and an elongated expander member insertable into said longitudinal opening so as to expand said expansion sleeve member and to thereby fix the latter in the mounting hole of the support structure, said expander member being provided with a thread with a round profile which has a predetermined pitch, a plurality of peaks and a plurality of valleys, said expander member being also provided with a further thread which is arranged on at least one of said pluralities of peaks and valleys and has a pitch corresponding to the pitch of said first-mentioned thread and a pointed profile, said further thread of said expander member having a plurality of interruptions while said first-mentioned thread remains uninterrupted.

4. A mounting element as defined in claim 1, wherein said expansion sleeve member is composed of a synthetic plastic material.

5. A mounting element as defined in claim 1, wherein said expansion sleeve member has a longitudinal slot communicating with said longitudinal opening.

6. A mounting element as defined in claim 1, wherein said expander member has a pointed end, each of said threads of said expander member having an outlet thread portion which extends to and narrows toward said pointed end.

7. A mounting element as defined in claim 1, wherein said further thread of said expander member has a saw-tooth shaped profile.

8. A mounting element as defined in claim 7, wherein said expander member has a pointed end, said further thread with a saw-tooth shaped profile having a plurality of inclined flanks facing toward said pointed end of said expander member.

9. A mounting element as defined in claim 8, wherein said further thread with a saw-tooth shaped profile has a plurality of flanks which extend normal to the direction of elongation of said expander member and face away from said pointed end of the latter.

10. A mounting element as defined in claim 1, wherein said first-mentioned thread of said expander member has a predetermined profile height, said further thread of said expander member having a profile height which is smaller than one-forth of the profile height of said first-mentioned thread.

11. A mounting element as defined in claim 1, wherein said longitudinal opening of said expansion sleeve member has a predetermined inner diameter, said first-mentioned thread of said expander member having an inner diameter which corresponds to the diameter of said longitudinal opening of said expansion sleeve member.

12. A mounting element as defined in claim 1, wherein said further thread of said expander member has a plurality of interruptions.

13. A mounting element as defined in claim 12, wherein said further thread has a plurality of convolutions at least some of which have said interruptions, said interruptions of said some convolutions being arranged at circumferentially identical locations.

14. A mounting element as defined in claim 13, wherein said convolutions of said further thread of said expander member include other convolutions which are not interrupted and arranged in alternating order with said some convolutions which are interrupted.

15. A mounting element as defined in claim 1, wherein each peak of said further thread of said expander member is arranged at an axis of symmetry of a respective one of said peaks or valleys of said one plurality of said peaks and valleys.

* * * * *